United States Patent [19]
Kamohara et al.

[11] 4,425,048
[45] Jan. 10, 1984

[54] JOINT FOR FRAMEWORK STRUCTURE

[75] Inventors: Hideaki Kamohara, Ibaraki; Minoru Imamura, Yamaguchi; Hiroshi Higaki, Kudamatsu; Yuji Yoshitomi, Ibaraki; Syuzo Uno; Kazuhiro Makino, both of Kudamatsu; Hiroshi Nomura, Hikari, all of Japan

[73] Assignee: Hitachi, Ltd., Tokyo, Japan

[21] Appl. No.: 255,101

[22] Filed: Apr. 17, 1981

[30] Foreign Application Priority Data

Apr. 18, 1980 [JP] Japan .................... 55-50386

[51] Int. Cl.³ .................... F16B 7/08; F16L 41/00
[52] U.S. Cl. .................... 403/191; 403/272; 403/284; 228/182
[58] Field of Search ............... 403/187, 188, 191, 192, 403/173, 171, 172, 271, 272, 284; 228/182, 173; 52/664, 665

[56] References Cited
U.S. PATENT DOCUMENTS

| 1,215,763 | 2/1917 | Beatty | 403/191 |
| 2,149,844 | 3/1939 | George | 403/272 X |
| 2,192,904 | 3/1940 | Ferris | 228/173 |
| 2,219,599 | 10/1940 | Penote | 228/182 X |
| 2,477,263 | 7/1949 | Otterson | 403/272 X |
| 2,885,462 | 5/1959 | Sylvester | 403/191 X |
| 3,263,630 | 8/1966 | Carlson | 403/187 X |
| 3,632,148 | 1/1972 | Garber | 403/271 X |
| 4,234,120 | 11/1980 | Pringle | 228/173 X |

FOREIGN PATENT DOCUMENTS 370383 4/1932 United Kingdom ............... 403/271

Primary Examiner—Wayne L. Shedd
Attorney, Agent, or Firm—Antonelli, Terry & Wands

[57] ABSTRACT

A joint for interconnecting a main pipe and an auxiliary pipe of a framework structure. The joint is adapted to envelope the main pipe and to be fixed thereto and is provided with an expanded portion. The auxiliary pipe is adapted to be fixed to the expanded portion of the joint so that the main pipe and the auxiliary pipe are connected to each other through the joint.

11 Claims, 24 Drawing Figures

JOINT FOR FRAMEWORK STRUCTURE

BACKGROUND OF THE INVENTION

1. Field of the Invention

The present invention broadly relates to a framework structure and, more particularly, to a joint for use in connecting a main pipe and an auxiliary pipe which in combination constitute the framework structure.

2. Description of the Prior Art

Figure 1:
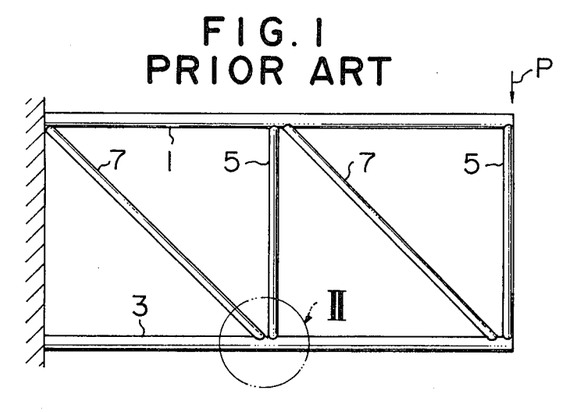
FIG. 1 shows a conventional framework structure.

The simplest form of conventional framework structure includes, as shown in FIG. 1, two main pipes 1, 3 and auxiliary pipes 5, 7 connected between two main pipes by welding. In the production of this conventional structure, when the main pipes 1 and 3 have a circular cross-section, it is necessary to cut and machine the end surfaces of the auxiliary pipes 5, 7 into an elliptic and saddle-like form. The requirement for the precision of this machining is severe in order to attain a close connection between the main pipes 1, 3 and the auxiliary pipes 5, 7. Accordingly, the machining work is difficult to conduct. Because of the elliptic and saddle-like form of the end surfaces of the branch pipes 5, 7, the welding line of the welding connection between the main pipes 1, 3 and the auxiliary pipes 5, 7 does not take the simple circular form. This non-circular welding line makes the welding work difficult. For these reasons, the production of the framework of the type described is not easy.

Furthermore, in the conventional framework in which the auxiliary pipes 5, 7 are welded directly to the main pipes 1, 3, there is a problem that, when a load P as shown in FIG. 1 is applied to the framework, a large local stress is generated in the juncture between the main pipes 1, 3 and the auxiliary pipes 5, 7 to cause a local deformation resulting in a deteriorated reliability in strength.

Figure 4:
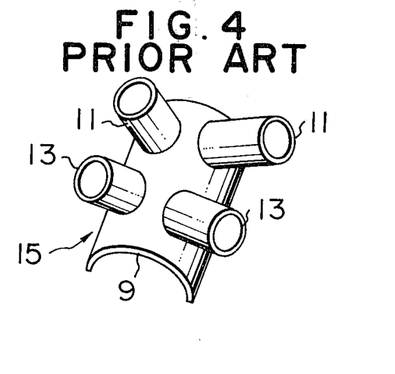
FIG. 4 is a perspective view of a conventional joint.

FIG. 4 shows another type of conventional framework using a joint 15. The joint 15 is constituted by a main part 9 and branching pipes 11, 13 projected from the main part 9, and is used in a manner shown in FIGS. 5, 6 and 7. Namely, auxiliary pipes 23, 25, 27, 29 and 31 are arranged between adjacent ones of three main pipes 17, 19 and 21 and are connected to the latter by the joints 15.

The part body 9 of the joint 15 has a semicylindrical form. In use of this joint, a complementary semicylindrical member 33 is united to this main part 9 by a butt welding to form a cylindrical body in combination with the latter. Then, the end surface of this cylindrical member, i.e. the end surfaces of the semicylinders 9 and 33 are welded to the end surface of the main pipe 17 so that the joint 15 is secured to the main pipe 17. Other joints 15 are secured to the main pipes 19 and 21 in the same manner. The end surface of any one of the auxiliary pipes 23, 25 and 27 is welded to the branch pipe 11 of the joint 15, while either one of the auxiliary pipes 29 and 31 is welded at its end to the branch pipe 13.

Figure 5:
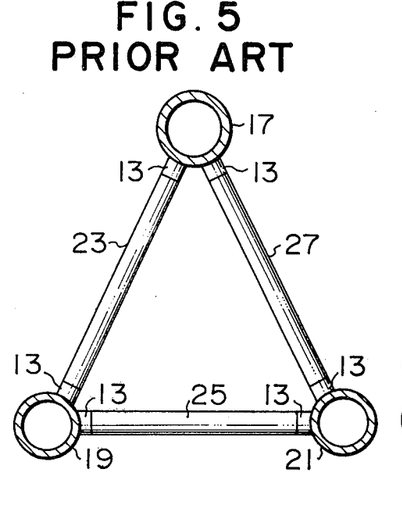
FIG. 5 shows in section a portion of a framework structure in which a main pipe and an auxiliary pipe are connected to each other by means of a joint as shown in FIG. 4.
Figure 6:
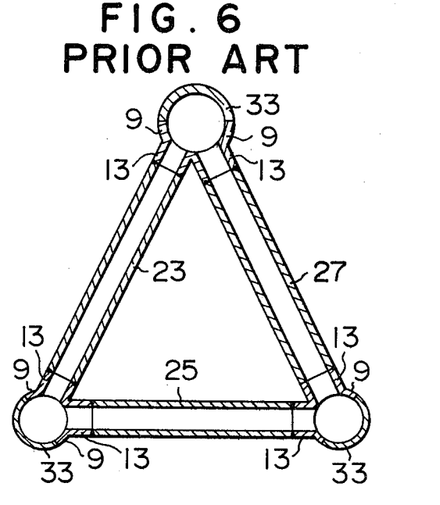
FIG. 6 is a longitudinal sectional view of the structure shown in FIG. 5.
Figure 7:
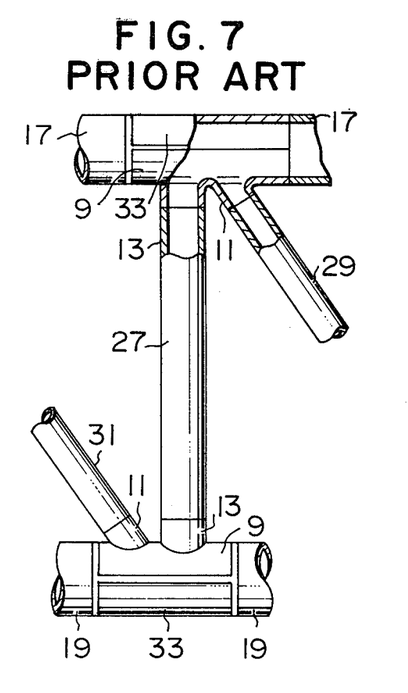
FIG. 7 is a partly sectioned side elevational view of the framework structure as shown in FIG. 5.

According to this arrangement, it is necessary only that the end surfaces of the auxiliary pipes 23, 25, 27, 29 and 31 are finished perpendicularly to the axes of the same auxiliary pipes, so that the processing is rather easy to perform. Also, the local deformation is avoided by adopting a sufficiently large plate thickness of the joint 15. However, the joint 15 having a sufficiently largely thickness can be produced only by a casting. If such a joint is to be produced by a plastic work, an extremely large press machine and special technic are required to make the production of the joint difficult and to increase the cost of the joint 15 uneconomically.

In addition, in the butt welding between the branch pipes 11, 13 of the joint 15 and the auxiliary pipes 23, 25, 27, 29, 31, as well as in the butt welding between the main part 9 and the main pipes 17, 19, 21, an impractically large bending stress is generated to reduce the reliability in strength if there is any misalignment of the pipes to be connected. Therefore, for assembling the framework structure with the joint 15, it is essential that the positioning of the members to be connected by butt welding be made at a high precision, resulting in a difficulty in the production of the framework.

Figure 2:
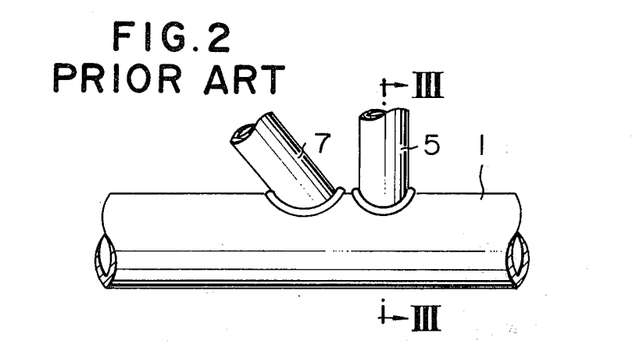
FIG. 2 is an enlarged view of a portion maked at an arrow II in FIG. 1.
Figure 8:
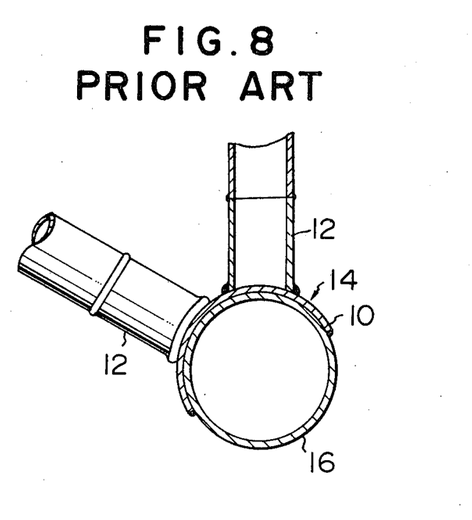
FIG. 8 is a partly sectioned end view of another type of conventional joint.

In order to overcome the difficulty in the production of the joint 15 and the difficulty in the positioning of the joints 15 in relation to the main pipes 17, 19, 21 for butt welding, it is considered to form a joint 14 by welding to a main part 10 branch pipes 12 formed separately from the main part and superpositioning and welding the main part 10 to the main pipe 16 as shown in FIG. 8. This solution, however, poses a problem that the same difficulty as encountered in the welding of the auxiliary pipes to the main pipe as shown in FIGS. 1 and 2 is encountered in the welding of the branch pipes 12 to the main part 10 because the latter has a curved surface. In addition, the joint 14 formed by welding exhibits a reduced strength in the welded part as compared with the joint 14 formed as one body.

Figure 3:
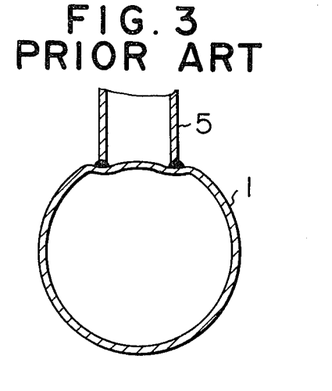
FIG. 3 is a sectional view taken along the line III—III of FIG. 2.
Figure 9:
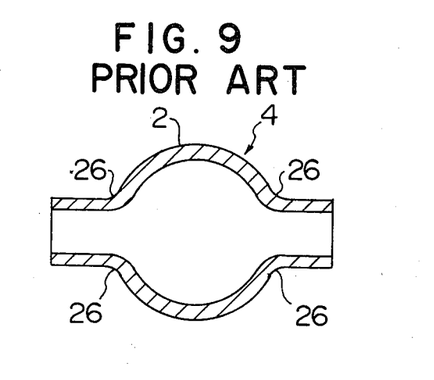
FIG. 9 is a longitudinal sectional view of another conventional joint.
Figure 10:
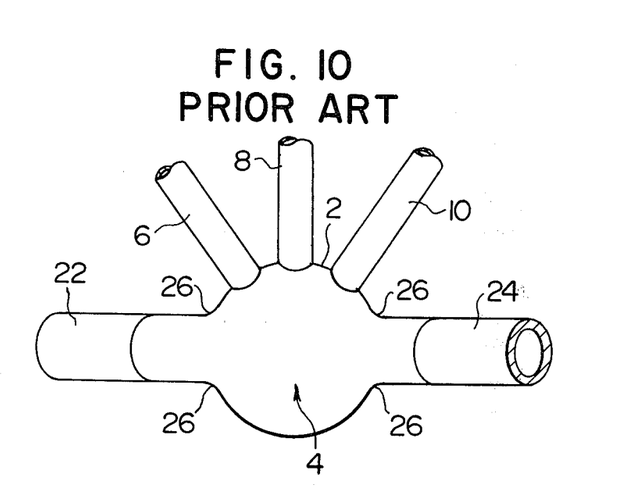
FIG. 10 is a segmentary view of main pipes and auxiliary pipes connected together by using the joint shown in FIG. 9.

FIG. 9 shows a joint (4) used in a further different type of conventional framework, which is casted and has a spherically formed hollow portion to which auxiliary pipes are to be connected. FIG. 10 shows a segmentary view of a framework using this joint. According to this type, auxiliary pipes 6, 8, 10 are welded perpendicular to the surface of the spherical portion 2. Therefore, the auxiliary pipes 6, 8, 10 are sufficient to be machined perpendicular to its axis at their ends, and further are welded easily because the auxiliary pipes 6, 8, 10 contact always close to the surface of the spherical portion 12 irrespective of their fitting angles with respect to the main pipe. This type has, however, a deteriorated reliability in strength similar to the type shown FIG. 7, because misalignments between the main pipes 22, 24 and the joint 4 often occur in face to face welding, causing bending stress in the structure. To prevent these undesirable phenomenon, it is required to arrange the joint 4 and main pipes 22, 24 at their precise positions. This is a demerit that the production becomes rather difficult. Further, in the spherical portion 2 rather large local stress will be generated under a heavy loading on the auxiliary pipes, as similar as in the case shown in FIG. 3. In addition, under the heavy axial compression force on the main pipe 22, 24, the spherical portion 2 of the joint 4 is apt to buckle at the transition portion 26. Abovementioned defects cause a deteriorated reliability in strength.

The drawbacks common to both of conventional joints 14, 15 reside in that an excessive local stress is generated because the joints 14, 15 cannot smoothly transmit the stress between the main pipe and the auxiliary pipe due to the fact that the branch pipes 11, 12, 13 project at acute angles from the main parts 9, 10, and in that the strength is lowered due to the fact that the projecting ends of the branch pipes 11, 12, 13 wholly open. In consequence, the reliability in the strength of the framework structure using joints is lowered impractically.

Further, the framework of the type using the joint 4 has a poor productivity in assembly process, because it is required to arrange the joint 4 and main pipes 22, 24 at their precise position, and has a deteriorated reliability, because the spherical portion 2 of the joint 4 is apt to suffer local stresses and to buckle at the portion thereof to which the auxiliary pipes are welded.

SUMMARY OF THE INVENTION

It is, therefore, an object of the invention to provide a joint which has easiness of fabrication and assembly and can improve the reliability in the strength of the framework structure.

To this end, according to the invention, there is provided a joint for connecting a main pipe and an auxiliary pipe of a framework structure to each other, characterized in that said joint is adapted to envelope said main pipe and to be fixed thereto and a portion of said joint to which said auxiliary pipe is to be welded is expanded.

The above and other objects, as well ad advantageous features of the invention will become more clear from the following description of the preferred embodiments taken in conjunction with the accompanying drawings.

DESCRIPTION OF THE PREFERRED EMBODIMENTS

Figure 11:
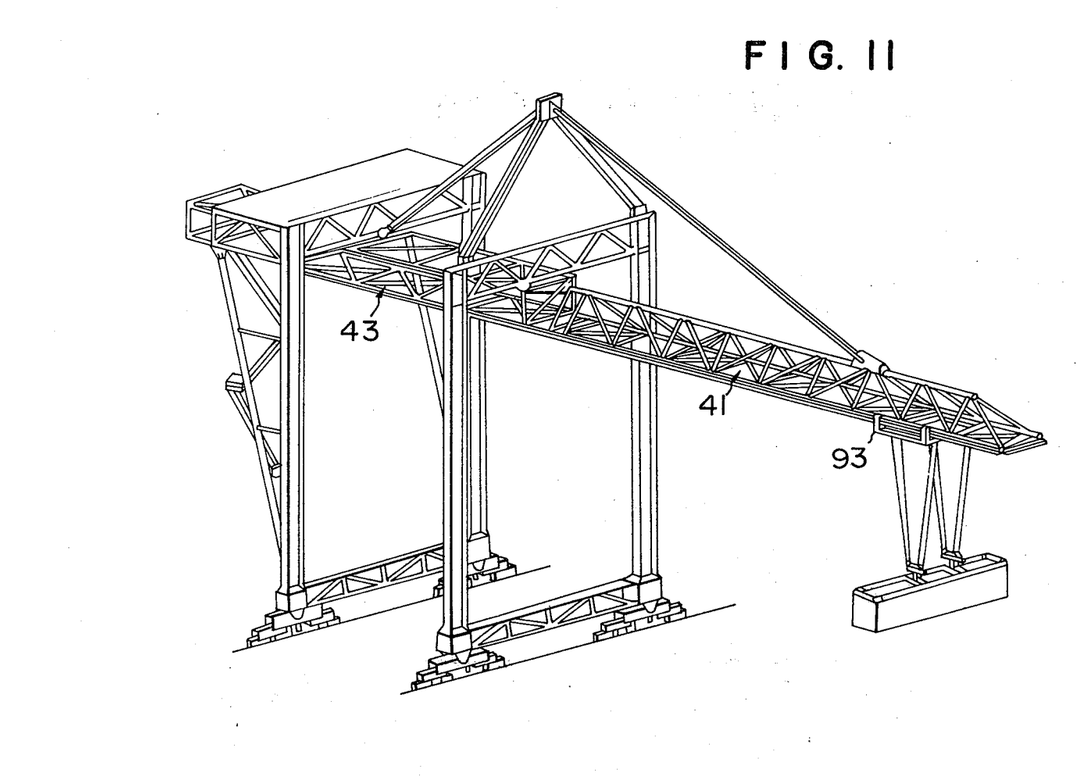
FIG. 11 is a perspective view of a container crane having a framework structure.

The framework structure to which the invention pertains is used practically as a boom 41 and a girder 43 of a container crane as shown in FIG. 11. Particularly, the boom 41 has three main pipes 45, 47, 49 and six kinds of auxiliary branch pipes 51, 53, 55, 57, 59 and 61.

Figure 14:
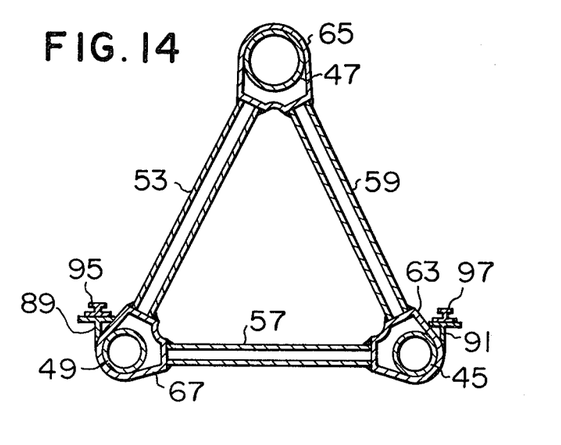
FIG. 14 is a sectional view taken along the line XIV—XIV of FIG. 13, showing particularly the joint in accordance with the first embodiment of the invention.

In the first embodiment of the invention described hereinunder, joints 63, 65 and 67 are used to connect the main pipes and the auxiliary pipes. As shown in FIG. 14, three main pipes 45, 47 and 49 are disposed at three apices of a triangle. A plurality of joints 63 are fixed to the main pipe 45 at a constant pitch in the longitudinal direction of the latter. Similarly, joints 65 and 67 are fixed to the main pipes 47 and 49 at a constant pitch along the lengths of respective main pipes.

Figure 15:
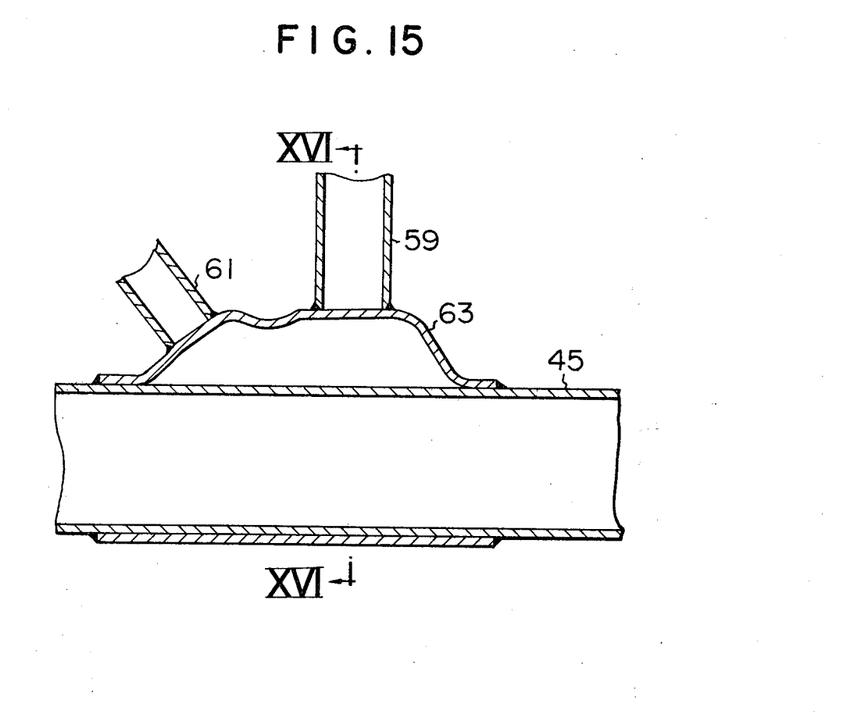
FIG. 15 is a vertical sectional view of the joint 63 shown in FIG. 12.
Figure 16:
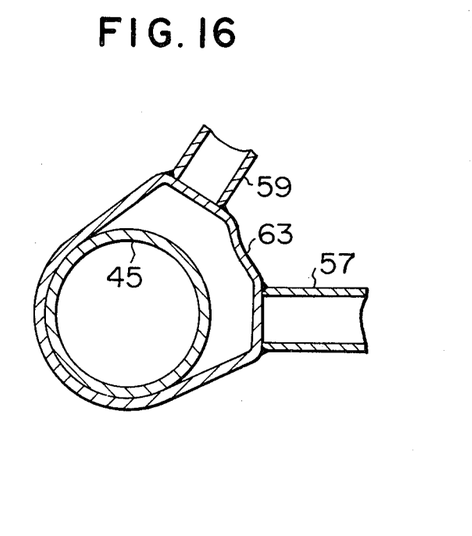
FIG. 16 is a sectional view of the joint of the first embodiment taken along the line XVI—XVI of FIG. 15.

As will be seen from FIGS. 14, 15 and 16, the joint 63 has a bore of a diameter which just fits around the main pipe 45 and has a portion expanding away from the main pipe 45. The joints 65 and 67 have constructions substantially identical to that of the joint 63 but the diameters of bores are differentiated in accordance with the difference in the diameters of the main pipes 47, 49 and the shapes of the expanded portions are varied depending on the angle of attaching of the auxiliary pipe.

A main pipe 45 is inserted into the joint 63 and welded at its both ends to the outer peripheral surface of the main pipe 45 so as to be fixed to the latter. Similarly, the joint 65 and the joint 67 are welded and fixed to respective main pipes 47 and 49.

The expanded portions of the joints 63, 65, 67 are formed by subjecting cylindrical blanks to a bulging effected by a bulging device to have a curved wall of a radius of curvature which is four or more times as large as the thickness of the blank material before the processing.

Furthermore, as shown in FIG. 16, the joint has a portion expanded in the tangential direction of the main pipe. The portion to which the auxiliary pipe is connected has a flattened surface.

Figure 12:
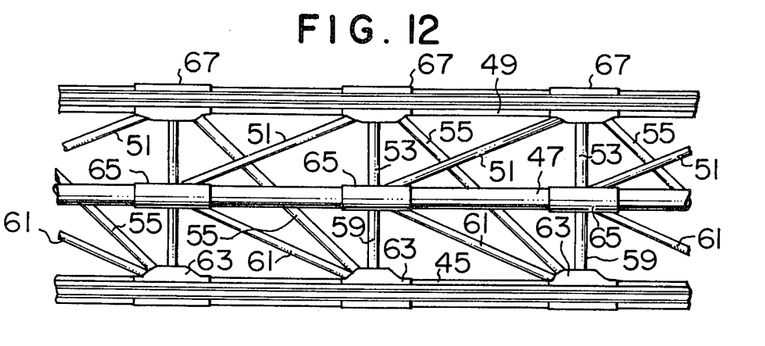
FIG. 12 is a top plan view of a boom of a container crane having a framework structure constructed with a joint in accordance with an embodiment of the invention.
Figure 13:
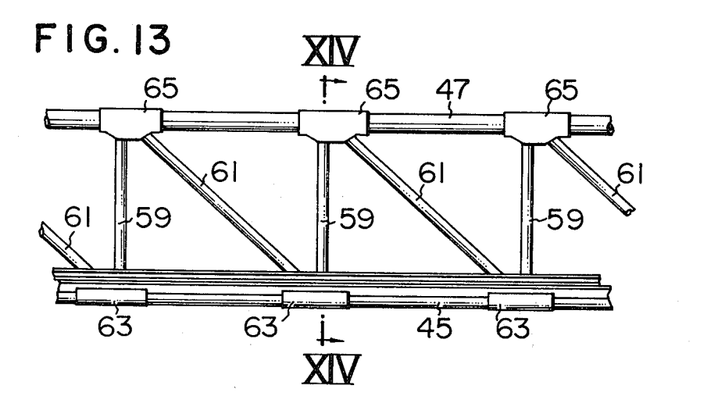
FIG. 13 is a side elevational view of the boom shown in FIG. 12 showing particularly the joint in accordance with the first embodiment of the invention.

As will be seen from FIGS. 12, 13 and 14, auxiliary pipes 55, 57, 59 and 61 are welded at their one ends to the expanded portion of the joint 63. Also, one ends of the auxiliary pipes 51, 53 and other end of the auxiliary pipes 59, 61 are welded to the expanded portion of the joint 65. Further, the other end portions of the auxiliary pipes 51, 53, 55 and 57 are welded to the expanded portion of the joint 67.

As will be seen from FIGS. 15 and 16, the connection between each end of each auxiliary pipe to the associated joint is made by placing the end surface of each pipe end to the flattened surface of the expanded portion of the associated joint and then welding the pipe end to the flattened surface.

T-shaped rail support plates 89 or 91 are welded to the main pipes 45, 49 or to the joints 63, 67 as will be understood from FIGS. 12, 13 and 14. On these rail support plates, welded are rails 95 or 97 along which a trolley shown in FIG. 11 runs.

The first embodiment having the described construction offers the following advantages.

(1) The joints 63, 65, 67 have smoothly curved configurations as compared with the joint of the prior art shown in FIG. 4. This configuration permits the joint to be formed as one body by a bulging, so that the number of steps of process for the production of the joints 63, 65, 67 is reduced advantageously.

(2) The expanded portion of each joint 63, 65, 67 forms a non-developed surface which has a high resistance to bending. In addition, since the expanded portion rises gently, the transmission of load between the main pipe and the auxiliary pipe is made in a smooth manner to reduce the local stress to ensure a higher reliability in strength.

(3) The surface of the expanded portion of each joint 63, 65, 67 to which the auxiliary pipe is to be welded is flattened to spread in a plane perpendicular to the auxiliary pipe. Therefore, it is not necessary to machine the end surface of the pipe end into a complicated shape and the welding between the expanded portion of the joint and the auxiliary pipe is made easily along a simple circular welding line.

(4) Since the pipe attaching portion of each joint 63, 65, 67 has a closed configuration, the undesirable radial deformation of the auxiliary pipe at the juncture is avoided to enhance the strength at the juncture to increase the reliability of the structure.

(5) Since the pipe attaching portion of each joint 63, 65, 67 has a closed configuration, the slight offset of the pipe attaching portion is allowed to facilitate the assembling. The increase of the stress due to this offset is small so that the reliability is further increased.

(6) Since the expanded portion of each joint 63, 65, 67 has a substantial spread with respect to the auxiliary pipe, the force applied to the auxiliary pipe is transmitted through the outside of the plate to avoid generation of large stress in the inner side of the portion of the joint where the auxiliary pipe is welded. Generally, imperfect welding or weld defect is liable to appear in the inner side of the above-mentioned portion of the joint. In this embodiment, since the generation of large stress in this portion of the joint is avoided, a sufficiently high strength is ensured even if the imperfect welding or weld defect appearing in that portion is large. Thus, according to this embodiment, it is possible to attain simultaneously both of higher reliability in strength and higher efficiency of welding work.

(7) Since the welding is conducted while keeping the end surface of the auxiliary pipe in contact with the joint 63, 65 or 67, the quality of the welding is stabilized to improve the reliability in strength.

(8) Since the framework is assembled with the end surfaces of the auxiliary pipes kept in contact with the joints 63, 65, 67, the auxiliary pipes function as gauges to permit an easy adjustment and control of the distance between main pipes to ensure a higher dimensional precision of the framework structure.

(9) Since the joints 63, 65, 67 are formed by a plastic work by means of a bulging device, the material of the joints is work-hardened to exhibit a higher strength to permit a reduction of the weight of the joint correspondingly.

(10) Since each joint 63, 65, 67 has a surface extending along the associated main pipe, it can easily be located when attached to the main pipe.

Figure 17:
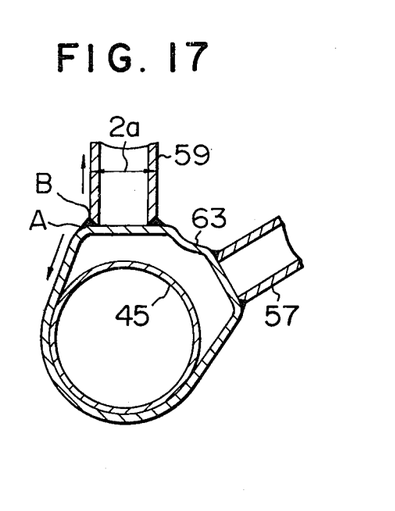
FIG. 17 is a sectional view of a structure used to investigate the stress distribution in the first embodiment of the invention.
Figure 18:
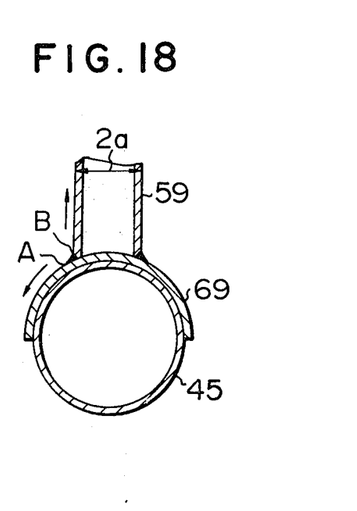
FIG. 18 is a sectional view of a structure used to investigate the stress distribution for the purpose of comparison with the structure shown in FIG. 17.
Figure 19:
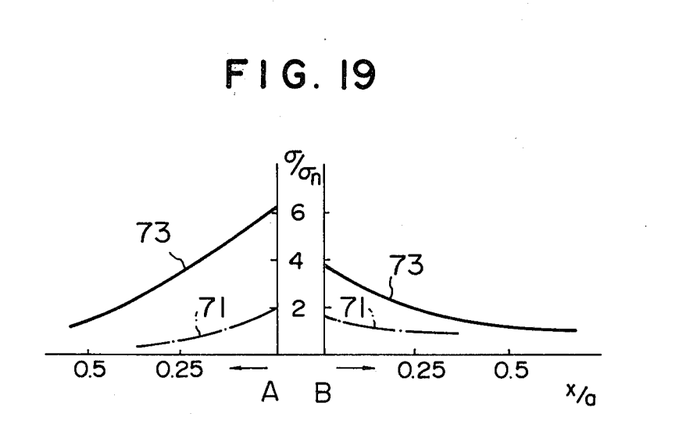
FIG. 19 show stress curves in the structures shown in FIGS. 17 and 18.

(11) In order to investigate the stress distribution, a member 69 having no expanded portion was superposed to the main pipe as shown in FIG. 18. The member 69 has the same thickness as the joint 63 of this embodiment as shown in FIG. 17. The joint 63 of this embodiment showed stresses at weld end points A, B as shown by a chain line curve 71 in FIG. 19. It will be seen that the levels of stress are much lower than those of the stress shown by a full-line curve 73 generated in the member 69 shown in FIG. 18. Thus, the joint of this invention is freed from unreasonable stress. In FIG. 19, "$\sigma_n$" represents the stress applied to the auxiliary pipe while "$\sigma$" represents a stress applied to any portion "x". The outside radius of the auxiliary pipe is represented by "a."

Figure 20:
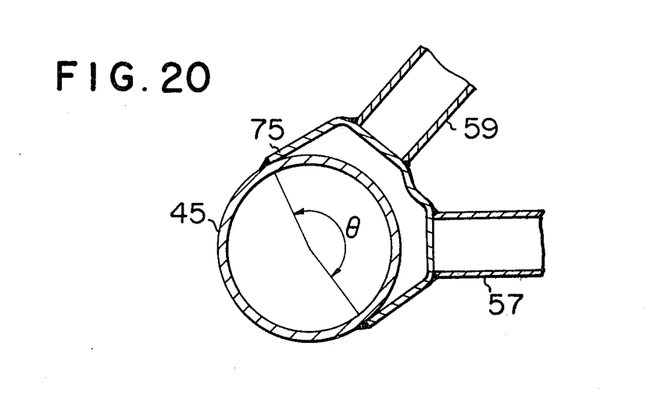
FIG. 20 is a sectional view of a joint in accordance with a second embodiment of the invention.

FIG. 20 shows a joint 75 in accordance with the second embodiment of the invention. Briefly, the joint of the second embodiment has a construction in which a half part of the joint 63, 65, 67 of the first embodiment is removed. The angle formed around the center of the main pipe between both circumferential ends of the joint is selected to be not greater than 180°. This joint 75 of the second embodiment is welded at its both circumferential ends to the main pipe such as the pipe 45 as shown in FIG. 20. Other portions are materially identical to those of the first embodiment.

This second embodiment offers the following advantages in addition to the advantages brought about by the first embodiment.

(1) The joint 75 having an opened main part can easily be produced by a press work or by casting with a mold.

(2) The step of insertion of the main tube into the bore of main part is eliminated to facilitate the attaching of the joint 75 to the main pipe.

(3) The material cost and processing cost are reduced to lower the cost of production of the joint.

(4) Stress is transmitted smoothly from the joint 75 to the main pipe (main pipe 45 in FIG. 20, for example) through the weld bead 77, so that no excessive local stress is generated in the main pipe.

Figure 21:
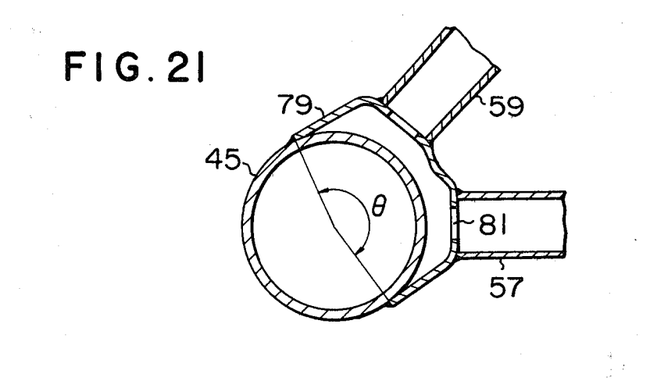
FIG. 21 is a sectional view of a joint in accordance with a third embodiment of the invention.

FIG. 21 shows a third embodiment which differs from the second embodiment shown in FIG. 20 in that apertures 81 are formed in the joint 79 so as to open to the inside of respective auxiliary pipes such as auxiliary pipes 57, 59 shown in FIG. 21. Other portions are materially identical to those of the second embodiment. Each aperture is so sized as not to cause a substantial degradation of mechanical strength of the joint 79.

This third embodiment offers the following advantages in addition to the advantages brought about by the second embodiment.

(1) The pressure of the gas generated during welding between the auxiliary pipe and the joint 79 is relieved into the joint 79 through the aperture 81, while the pressure of the gas in the joint 79 is relieved to the outside through the other aperture 81 or the gap between the main pipe 45 and the end surface of the joint 79 before the main pipe 45 and the joint 79 are welded. In consequence, the bad influence of the gas pressure on the deposited metal is avoided.

(2) If the plastic work of the blank material into the shape of the joint 79 is made after the formation of the apertures 81, the plastic work is facilitated because the plastic flow of the material into the aperture is permitted to some extent.

In a joint 83 of the fourth embodiment, the portions of the expanded portion to which the auxiliary pipes are to be welded are spaced to have spherical forms. For instance, referring to FIG. 22, the joint 83 has portions projected spherically at a radius "r" around point "c." Auxiliary pipes 59 and 57 are made to contact at their ends with the surfaces of the spherical projections and welded to the latter. Other portions are materially identical to those of the second embodiment.

This fourth embodiment offers the following advantages an addition to the advantages brought about by the second embodiment.

(1) Since the portion of the joint to which each auxiliary pipe is to be welded has a spherical surface, the end of the auxiliary pipe can be cut at a right angle to the axis 85 of the pipe, and the auxiliary pipe can easily be welded to the joint 83.

Figure 22:
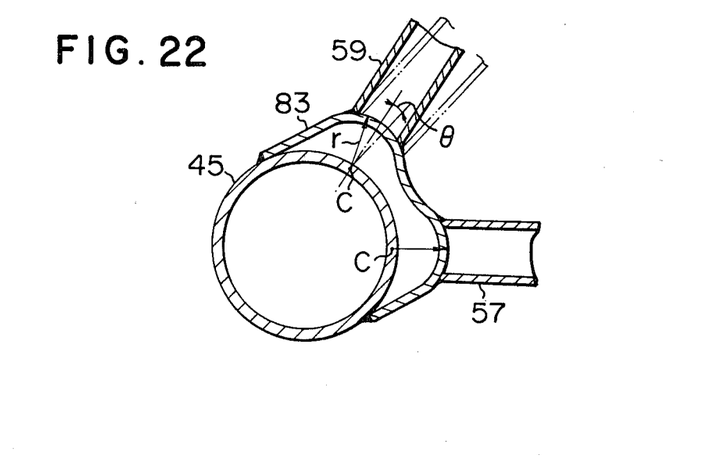
FIG. 22 is a sectional view of a joint in accordance with a fourth embodiment of the invention.

(2) Since the portion of the joint to which the auxiliary pipe is to be welded has a spherical surface, it is possible to weld the end surface of the auxiliary pipe to the joint without reforming the end surface of the auxiliary pipe 59, even when the angle of attaching of the auxiliary pipe 59 is changed by an angle $\theta_a$. Namely, there is a larger tolerance of angle of attaching of the auxiliary pipe.

(3) Since the portion of the joint to which the auxiliary pipe is to be welded has a spherical surface, it is not necessary to effect a bending at a small angle as in the case of preceding embodiments in which the portion to which the auxiliary pipe is to be welded is flattened. In consequence, the plastic work for forming the joint 83 is very much facilitated.

Figure 23:
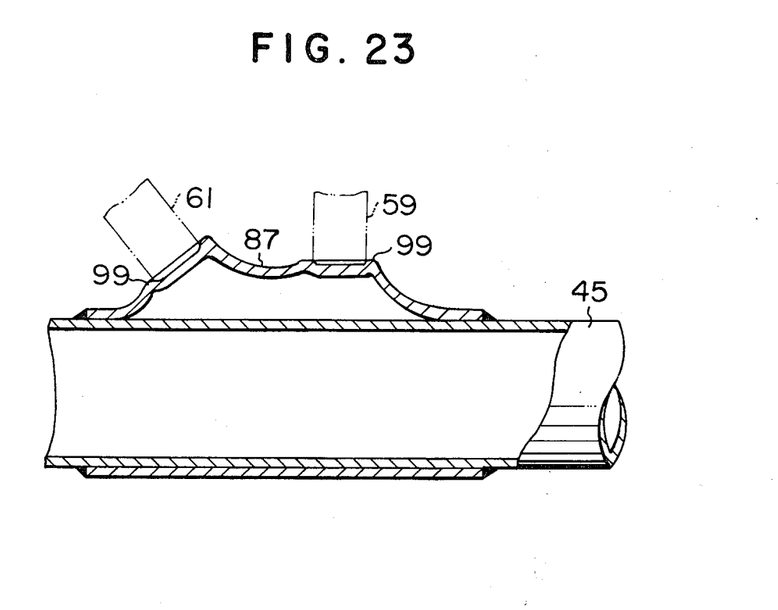
FIG. 23 is a sectional view of a joint in accordance with a fifth embodiment of the invention.
Figure 24:
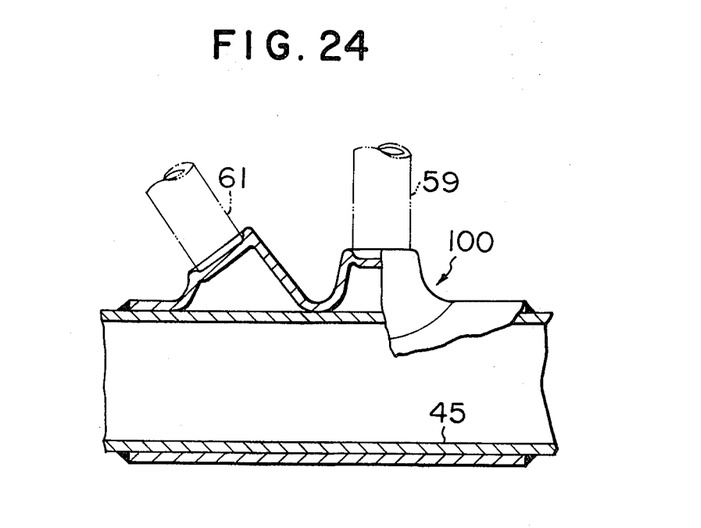
FIG. 24 is a sectional view of a joint in accordance with a sixth embodiment of the invention.

FIG. 23 shows a joint 100 in accordance with a fifth embodiment of the invention. In this embodiment, the expanded portion of the joint 87 is further protruded at its portions around the areas to which the auxiliary pipes 59, 61 are to be welded, toward respective auxiliary pipes, to facilitate the work for locating the auxiliary pipes 59, 61 with respect to the joint 87. Other portions are materially identical to those of the first embodiment. FIG. 24 shows a sixth embodiment of the invention, where the expanded portion of the joint 100 is protruded distinctively toward respective auxiliary pipes 59, 61 and the peripheries 99 (FIG. 23) of each area to which the auxiliary pipe is to be welded is further protruded as will be seen from FIG. 24.

In this sixth embodiment, a larger strength is ensured as compared with the joint of the prior art thanks to the non-developed surface of the expanded portion, although the smoothness of the stress transmission is inferior to those in the preceding embodiments.

As has been described, the embodiments explained heretofore have the following common features.

Namely, the joint of the invention is adapted to be superposed and fixed by welding to main pipe and provided with an expanded portion to which the auxiliary pipes are fixed by welding. The strength is increased owing to the non-developed surface presented by the expanded portion to permit the production of framework structure having a high reliability of strength in the connection between the main pipes and the auxiliary pipes.

What is claimed is:

1. A joint, for connecting a main pipe with at least one auxiliary pipe, comprising an at least substantially semicylindrical member having at least partially cylindrical, unexpanded end portions for fitting around a cylindrical main pipe, and a middle portion which is radially expanded relative to said end portions and has transitional surface portions producing a gradual raising of said expanded portion from said end portions, and at least one auxiliary pipe mounting portion protruding from the expanded middle portion.

2. A joint according to claim 1, wherein said at least semicylindrical member is a cylindrical member.

3. A joint according to claim 2, wherein said auxiliary pipe mounting portion has a flat surface for mounting the end surface of said auxiliary pipe.

4. A joint according to claim 1, wherein said auxiliary pipe mounting portion has a flat surface for mounting the end surface of said auxiliary pipe.

5. A joint according to claim 1, wherein said auxiliary pipe mounting portion has a closed configuration.

6. A joint according to claim 2, wherein said auxiliary pipe mounting portion has a closed configuration.

7. A joint according to claim 2, wherein said expanded middle portion is an outwardly bulged part of said cylindrical member, whereby its strength has been increased by work-hardening resulting from the bulging thereof.

8. A joint according to claim 1, wherein said expanded middle portion is an outwardly bulged part of said semicylindrical member, whereby its strength has been increased by work-hardening resulting from the bulging thereof.

9. A framework comprising a main pipe, at least one auxiliary pipe and a joint connecting said main pipe to said at least one auxiliary pipe, said joint comprising an at least substantially semicylindrical member having at least partially cylindrical, unexpanded end portions fitting around the cylindrical main pipe, and a middle portion which is radially expanded relative to said end portion and has transitional surface portions producing a gradual raising of said expanded portion from said end portions, and at least one auxiliary pipe mounting portion protruding from the expanded middle portion and to which an auxiliary pipe is connected.

10. A framework according to claim 9, wherein said auxiliary pipe mounting portion has a protruded shape and said auxiliary pipe contacts with the protruded shape along a line lying on a plane perpendicular to the axis of said auxiliary pipe.

11. A framework according to claim 10, wherein said at least partially cylindrical member is a cylindrical member and wherein said cylindrical member has an unexpanded, partially cylindrical middle portion disposed on an opposite side of said main pipe from said radially expanded middle portion and is connected thereto by further gradual transitional surface portions, whereby a closed configuration is created.

* * * * *